US008706582B2

(12) United States Patent
Pattabiraman et al.

(10) Patent No.: US 8,706,582 B2
(45) Date of Patent: Apr. 22, 2014

(54) MANAGING SERVICE SUBSCRIPTIONS IN A NETWORK

(75) Inventors: Ravikumar Pattabiraman, Hillsborough, NJ (US); Daniel J. Murphy, Scotch Plains, NJ (US); Ho Yin Cheuk, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 764 days.

(21) Appl. No.: 12/275,445

(22) Filed: Nov. 21, 2008

(65) Prior Publication Data

US 2010/0131393 A1    May 27, 2010

(51) Int. Cl.
*G06F 19/00*   (2011.01)
*H04M 15/00*   (2006.01)
*H04W 4/24*    (2009.01)
*H04M 17/00*   (2006.01)
*H04M 11/00*   (2006.01)

(52) U.S. Cl.
CPC ............... *H04W 4/24* (2013.01); *H04M 15/00* (2013.01); *H04M 17/00* (2013.01)
USPC ............................. 705/34; 455/406; 379/114.2

(58) Field of Classification Search
CPC ........ H04W 4/24; H04M 15/00; H04M 17/00
USPC .............................. 705/34; 455/406; 379/114.2
See application file for complete search history.

(56) References Cited

U.S. PATENT DOCUMENTS

| | | | |
|---|---|---|---|
| 6,801,781 B1 * | 10/2004 | Provost et al. | 455/466 |
| 7,224,783 B2 * | 5/2007 | Creamer et al. | 379/127.01 |
| 8,195,783 B2 * | 6/2012 | Crimi et al. | 709/223 |
| 2002/0049675 A1 * | 4/2002 | Kailamaki et al. | 705/44 |
| 2003/0027554 A1 * | 2/2003 | Haumont | 455/414 |
| 2003/0125968 A1 * | 7/2003 | Uppal | 705/1 |
| 2004/0077332 A1 * | 4/2004 | Ephraim et al. | 455/405 |
| 2004/0185282 A1 * | 9/2004 | Rosenbaum et al. | 428/480 |
| 2008/0027839 A1 * | 1/2008 | O'Regan et al. | 705/34 |
| 2008/0086371 A1 * | 4/2008 | Daymond et al. | 705/14 |
| 2008/0209415 A1 * | 8/2008 | Van Riel et al. | 718/1 |
| 2009/0186598 A1 * | 7/2009 | Cipoletti et al. | 455/406 |

OTHER PUBLICATIONS

Is the U.S. Market Gearing Up for a Prepaid Rush? (1999). Phillips Business Information's PCS Week, 10(33), 1. Retrieved from http://search.proquest.com/professional/docview/224835972?accountid=161862.*

* cited by examiner

*Primary Examiner* — Scott Zare

(57) ABSTRACT

A computer-implemented method may include associating a first bundle with a subscriber on a first subscription date, the first bundle defining a pre-paid service, a first renewal date, and a first renewal price. The method may include associating a second bundle with the subscriber on a second date different than the first subscription date and different than the first renewal date, the second bundle defining a feature, not defined in the first bundle, of the prepaid service and a second renewal price, the second bundle having the first renewal date. The method may also include renewing the first bundle and the second bundle on the first renewal date if a balance of an account associated with the subscriber is greater than or equal to the first renewal fee plus the second renewal fee.

24 Claims, 17 Drawing Sheets

FIG. 1   SUBSCRIBER BUNDLE TREE 100

FIG. 5A
BASIC CALLING PLAN BUNDLE 110

| Field | Value |
|---|---|
| NAME 502 | BASIC CALLING PLAN |
| RULES 503 | $0.20 / MIN DOMESTIC; $1.20 / MIN INTERNATIONAL |
| TYPE 504 | FAMILY / STANDALONE |
| ID 506 | 1156 |
| PERIODIC 507 | YES / NO |
| PERIOD 508 | MONTHLY / WEEKLY / DAILY |
| BOU 510 | YES / NO |
| FIXED RENEWAL DATE 512 | YES / NO |
| PRORATE 514 | YES / NO |
| RENEWAL FEE 516 | $20 |
| RENEWAL FAILURE ACTIONS 518 | BLOCK NON-EMERGENCY CALLS |
| PRIORITY 520 | 5 |
| TRIGGER CRITERIA 522 | N/A |
| RENEWAL DATE 530 | APRIL 20 |
| RENEW NEXT PERIOD 531 | YES / NO |
| TOTAL RENEWAL FEE 532 | $24 |
| STATE 534 | ACTIVE / SUSPENDED |
| CHILDREN 536 | YES / NO |

| RENEWAL DATE 530 | APRIL 20 |
| --- | --- |
| RENEW NEXT PERIOD 531 | YES / NO |
| TOTAL RENEWAL FEE 532 | $24 |
| STATE 534 | ACTIVE / SUSPENDED |
| CHILDREN 536 | YES / NO |

FIG. 5B

FREE NIGHTS AND
WEEKENDS BUNDLE 112

| NAME 502 | FREE NIGHTS AND WEEKENDS |
| --- | --- |
| RULES 503 | FREE DOMESTIC M-F (MIDNIGHT–6AM; 7PM–MIDNIGHT); SAT & SUN |
| TYPE 504 | FAMILY / STANDALONE |
| ID 506 | 1156 |
| PERIODIC 507 | YES / NO |
| PERIOD 508 | MONTHLY / WEEKLY / DAILY |
| BOU 510 | YES / NO |
| FIXED RENEWAL DATE 512 | YES / NO |
| PRORATE 514 | YES / NO |
| RENEWAL FEE 516 | $2 |
| RENEWAL FAILURE ACTIONS 518 | BLOCK NON-EMERGENCY CALLS |
| PRIORITY 520 | 10 |
| TRIGGER CRITERIA 522 | N/A |

FIG. 5C
VOICEMAIL BUNDLE 114

| Field | Value |
|---|---|
| RENEWAL DATE 530 | APRIL 20 |
| RENEW NEXT PERIOD 531 | YES / NO |
| TOTAL RENEWAL FEE 532 | $24 |
| STATE 534 | ACTIVE / SUSPENDED |
| CHILDREN 536 | YES / NO |

| Field | Value |
|---|---|
| NAME 502 | VOICEMAIL |
| RULES 503 | RECEIVE UNANSWERED CALLS |
| TYPE 504 | FAMILY / STANDALONE |
| ID 506 | 1156 |
| PERIODIC 507 | YES / NO |
| PERIOD 508 | MONTHLY / WEEKLY / DAILY |
| BOU 510 | YES / NO |
| FIXED RENEWAL DATE 512 | YES / NO |
| PRORATE 514 | YES / NO |
| RENEWAL FEE 516 | $2 |
| RENEWAL FAILURE ACTIONS 518 | NO VOICEMAIL |
| PRIORITY 520 | 10 |
| TRIGGER CRITERIA 522 | N/A |

FIG. 5D

INTERNATIONAL ROAMING BUNDLE 115

| Field | Value |
|---|---|
| NAME 502 | INTERNATIONAL ROAMING |
| RULES 503 | $0.50 / MIN INTERNATIONAL |
| TYPE 504 | FAMILY / STANDALONE |
| ID 506 | 5634 |
| PERIODIC 507 | YES / NO |
| PERIOD 508 | MONTHLY / WEEKLY / DAILY |
| BOU 510 | YES / NO |
| FIXED RENEWAL DATE 512 | YES / NO |
| PRORATE 514 | YES / NO |
| RENEWAL FEE 516 | $5 |
| RENEWAL FAILURE ACTIONS 518 | N/A |
| PRIORITY 520 | 10 |
| TRIGGER CRITERIA 522 | ORIGINATING CALL FROM FOREIGN COUNTRY |
| RENEWAL DATE 530 | APRIL 26 |
| RENEW NEXT PERIOD 531 | YES / NO |
| TOTAL RENEWAL FEE 532 | $5 |
| STATE 534 | ACTIVE / SUSPENDED |
| CHILDREN 536 | YES / NO |

600

FIG. 7    SUBSCRIBER BUNDLE TREE 100-1

SUBSCRIBER BUNDLE TREE
100-2

SUBSCRIBER BUNDLE TREE
100-3

1100

1200

1300

1400

MANAGING SERVICE SUBSCRIPTIONS IN A NETWORK

BACKGROUND INFORMATION

Mobile devices (e.g., cell phones, PDAs, pagers, and similar devices) can provide easy access to an array of applications from almost any location at any time. Such applications include voice messaging (e.g., voicemail), telephone calling, text and picture messaging (e.g., SMS and MMS), web browsing, email, gaming, music, and video.

Typically, users receive these services either through a contract, or a pay-as-you-go or prepaid subscription with a service provider. If the user receives the services through a contract, the user may receive a bill at the end of each pay period, e.g., at the end of each month. If the user receives the services through a prepaid subscription, then the subscriber's account may be debited at the beginning of each pay period, e.g., at the beginning of each month.

BRIEF DESCRIPTION OF THE DRAWINGS

FIGS. 5A-5D are block diagrams of exemplary data stored in bundles;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Embodiments disclosed herein allow for a network provider to define services and service features in a network and associate them with subscribers (e.g., users). Embodiments disclosed also allow for subscribers to select (e.g., subscribe) to these services and features. The services and features may be defined by bundles, which may be grouped into families of bundles.

A bundle, as the term is used herein, defines characteristics and/or features of a service provided by the service provider. A bundle tree defines the relationship that bundles have with each other for a particular subscriber. Examples of services defined in a bundle include, for example, the ability to place and receive voice calls from a phone; the ability to download or upload data from/to the Internet (e.g., surf the web or read email) using your smart phone or computer; the ability to play an interactive game over a network; the ability to watch broadcast television, etc. Examples of the characteristics and features of a services defined in a bundle may include the cost per minute for a phone call, the cost per megabyte of data, the cost of monthly recurring fees, and the date such fees are due.

Figure 1:
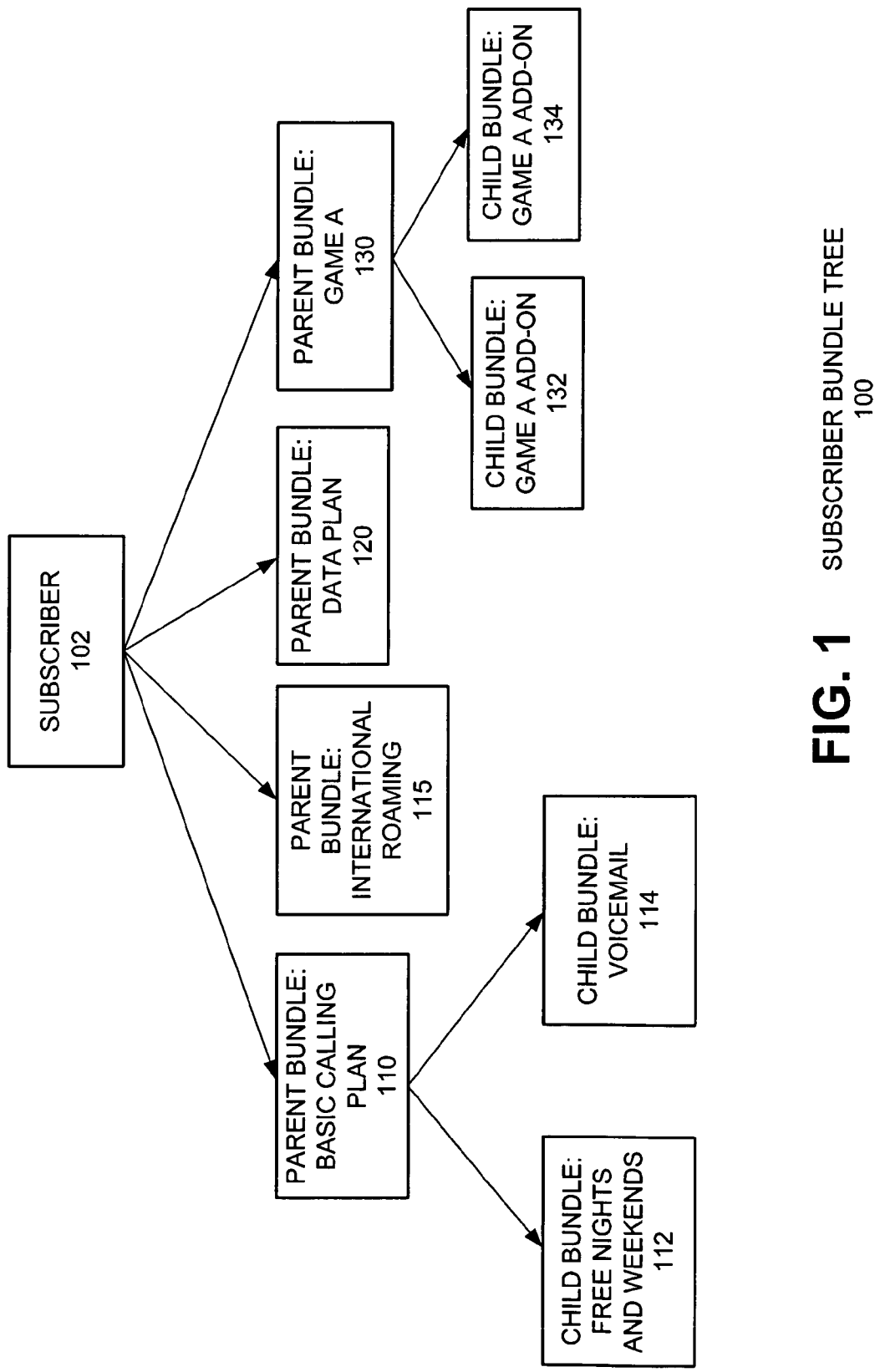
FIG. 1 is a block diagram of an exemplary subscriber bundle tree.

FIG. 1 is a block diagram of an exemplary subscriber bundle tree 100 for a subscriber 102. Each subscriber to the services of a network may be associated with a different bundle tree that defines the services and features to which the corresponding subscriber has a subscription. Bundle tree 100 includes four parent bundles: bundles 110, 115, 120, and 130. Parent bundle 110 includes child bundles 112 and 114, and parent bundle 130 includes child bundles 132 and 134. Parent bundles 115 and 120 do not have any child bundles.

Parent bundle 110 corresponds to a subscription to a "Basic Calling Plan." Child bundle 112 corresponds to a subscription to "Free Nights and Weekends" and child bundle 114 corresponds to a subscription to "Voicemail." Parent bundle 115 corresponds to a subscription to "International Roaming." Parent bundle 120 corresponds to a subscription to a "Data Plan." Parent bundle 130 corresponds to a subscription to a "Game A," while child bundles 132 and 134 correspond to "Game A Add-Ons."

Figure 2:
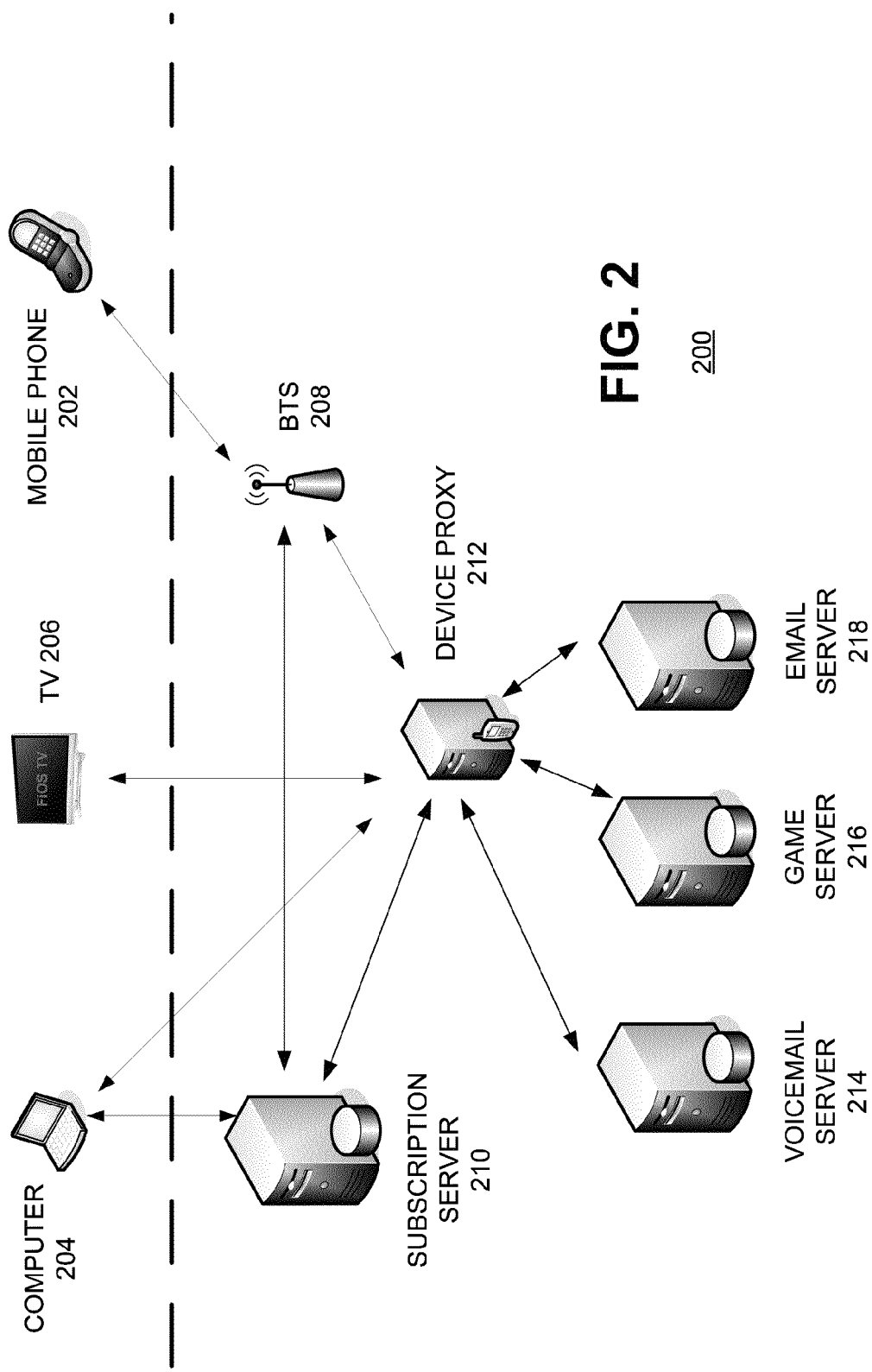
FIG. 2 is a block diagram of an exemplary network in which embodiments described herein may be implemented.

Bundle tree 100 may represent the services offered by a network 200 to which subscriber 102 has availed himself (e.g., has subscribed to or is associated with). FIG. 2 is a block diagram of exemplary network 200. Network 200 may include a mobile phone 202, a computer 204, a television (TV) 206, a base transceiving station (BTS) 208, a subscription server 210, a device proxy 212, a voicemail server 214, a game server 216, and an email server 218.

Mobile phone 202 may allow a user (e.g., subscriber 102) to place telephone calls to other user devices. Mobile phone 202 may communicate with other devices via BTSs, such as BTS 208, using a wireless communication protocol, e.g., GSM (Global System for Mobile Communications), CDMA (Code-Division Multiple Access), WCDMA (Wideband CDMA), GPRS (General Packet Radio Service), EDGE (Enhanced Data Rates for GSM Evolution), etc. In one embodiment, mobile phone 202 may communicate with other devices using wireless network standards such as WiFi (e.g., IEEE 802.11x) or WiMAX (e.g., IEEE 802.16x). In other embodiments, mobile phone 202 may also communicate with other devices via a wired network. For example, mobile phone 202 may communicate with other devices using a public-switched telephone network (PSTN) or the Ethernet protocol.

Computer 204 may include one or more computer systems for hosting programs, databases, and/or applications. Computer 204 may include a laptop, desktop, or any other type of computing device. Computer 204 may include a browser application program for navigating a network, such as the Internet and/or network 200. Computer 204 may include client application programs to allow a user (e.g., subscriber 102) to play games offered by game server 216, to listen to voicemail stored in voicemail server 214, or to read email stored in email server 218, for example.

TV 206 may include a device capable of receiving and reproducing video and audio signals, e.g., a video display device. TV 206 may include a liquid crystal display (LCD), a cathode ray tube (CRT), a plasma display, etc. TV 206 may be associated with a set-top box (STB) (not shown) and/or a remote control. The STB may include a computer device, such as a cable card, for hosting programs, databases, and/or applications. The remote control may include control keys to navigate menus displayed on TV 206, for example, and to otherwise control functions of TV 206 and/or the STB. TV 206 may include a client application program to allow a user (e.g., subscriber 102) to play games offered by game server 216, for example.

Subscription server 210 may maintain the accounts of users of (e.g., subscribers to) the services provided by network 200. The accounts of users may include the user identities, account balances, user activity, etc. Subscription server 210 may store data and data structures to represent subscriber bundle tree 100, for example, for subscriber 102. Subscription server 210 may also store data and data structures to represent bundle trees for many other subscribers. Subscription server 210 may include one or more computer systems for hosting programs, databases, and/or applications.

Device proxy 212 may receive communications from mobile phone 202, TV 206, and/or computer 204 for forwarding to other devices (e.g., VM server 214, game server 216, and/or email server 218).

Voicemail (VM) server 214, game server 216, and email server 218 may provide some of the exemplary services offered by network 200. VM server 214 may receive and store voicemail messages in mailboxes associated with one or more user devices, such as mobile phone 202. VM server 214 may receive voicemail messages when, for example, a user does not answer a call. VM server 214 may deliver voicemail messages when requested, for example, to mobile phone 202, computer 204, or TV 206.

Game server 214 may allow subscribers to play interactive games on user devices, such as devices 202-204. Email server 218 may receive and store email messages in mailboxes associated with one or more user devices, such as mobile phone 202. Email server 218 may deliver email messages when requested, for example, to mobile phone 202, computer 204, or TV 206.

In other embodiments, network 200 may include more, fewer, or different devices. For example, network 200 may include an SMPP (Short Message Peer-to-Peer) gateway that may pass SMS (Short Message System) messages to and from mobile devices, such as mobile phone 202. Network 200 may also include thousands, if not hundreds of thousands, of devices such as devices 202-204.

Moreover, one or more devices 202-218 may perform one or more functions of any other device in network 200. Although FIG. 2 shows devices 202-218 coupled to each other in a particular configuration, devices 202-218 may also be arranged in other configurations, either coupling directly with each other or through one or more networks, such that any one of devices 202-218 may communicate with any other one of devices 202-218. For example, any one of devices 202-218 may communicate with any other one of devices 202-218 through the Internet, an ad hoc network, a local area network (LAN), a wide area network (WAN), a metropolitan area network (MAN), a cellular network, a PSTN, a high-speed fiber optic network (e.g., FiOS™), or any other network or combinations of networks.

Figure 3:
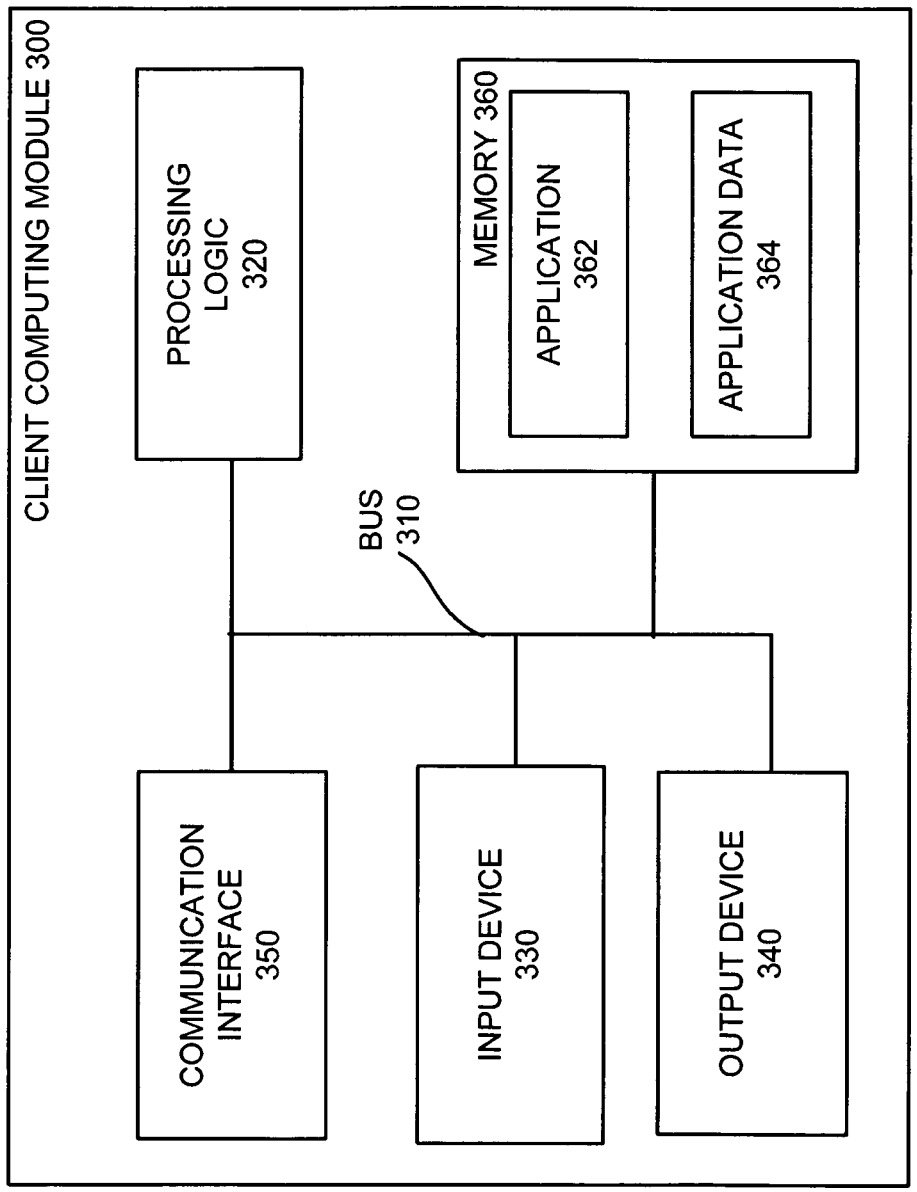
FIG. 3 is a block diagram of exemplary components of a client computing module.

FIG. 3 is a block diagram of exemplary components of a client computing module 300. Devices 202-206, for example, may each include one or more computing modules 300. Client computing module 300 may include a bus 310, processing logic 320, an input device 330, an output device 340, a communication interface 350, and a memory 360. Client computing module 300 may include other components (not shown) that aid in receiving, transmitting, and/or processing data. Moreover, other configurations of components in client computing module 300 are possible.

Bus 310 may include a path that permits communication among the components of client computing module 300. Processing logic 320 may include any type of processor or microprocessor (or families of processors or microprocessors) that interprets and executes instructions. In other embodiments, processing logic 320 may include an application-specific integrated circuit (ASIC), a field-programmable gate array (FPGA), or the like.

Input device 330 may include a device that permits a user to input information into client computing module 300, such as a keyboard (e.g., the keypad of phone 202), a mouse, a pen, a microphone, a remote control, a touch-screen display, etc. Output device 340 may include a device that outputs information to the user, such as a display, a printer, a speaker, etc.

Input device 330 and output device 340 may allow the user to activate a particular service or application, such as a voicemail application and/or a game. Input device 330 and output device 340 may allow the user to receive and view a menu of options and select from the menu options. The menu may allow the user to select various functions or services associated with applications executed by client computing module 300.

Communication interface 350 may include any transceiver-like mechanism that enables client computing module 300 to communicate with other devices and/or systems. Communication interface 350 may include a transmitter that may convert baseband signals to radio frequency (RF) signals and/or a receiver that may convert RF signals to baseband signals. Alternatively, communication interface 350 may include a transceiver to perform functions of both a transmitter and a receiver. Communication interface 350 may be coupled to an antenna for transmission and reception of the RF signals. Communications interface 350 may include a network interface card, e.g., Ethernet card, for wired communications or a wireless network interface (e.g., a WiFi) card for wireless communications. Communication interface 350 may also include, for example, a universal serial bus (USB) port for communications over a cable, a Bluetooth™ wireless interface for communicating with Bluetooth devices, a near-field communication (NFC) interface, etc. Communication interface 350 may implement a wireless communication protocol, e.g., GSM, CDMA, WCDMA, GPRS, EDGE, etc. Communications interface 350 may also receive, transmit and/or process digital or analog audio inputs/outputs and/or digital or analog video inputs/outputs.

Memory 360 may include a random access memory (RAM) or another type of dynamic storage device that may store information and instructions, e.g., an application 362 and application data 364, for execution by processing logic 320; a read-only memory (ROM) device or another type of static storage device that may store static information and instructions for use by processing logic 320; and/or some other type of magnetic or optical recording medium and its corresponding drive, e.g., a hard disk drive (HDD), for storing information and/or instructions.

In the case of computer 204, for example, e.g., application 462 may include a web browser for surfing the internet and/or network 200 for configuring subscriber information stored in subscriber server 210. In the case of TV 206 or mobile phone 202, for example, application 462 may include programs to take advantage of the services offered by network 200, such as game applications, voicemail applications, and/or an email client. Application data 464 may include the data used and stored by application 462, such as game scores, emails, voicemails, etc.

Client computing module 300 may perform certain operations, as described herein. Client computing module 300 may perform these operations in response to processing logic 320 executing software instructions contained in a computer-readable medium, such as memory 360. A computer-readable medium may be defined as a physical or logical memory device. The software instructions may be read into memory 360 from another computer-readable medium or from another device via communication interface 350. The software instructions contained in memory 360 may cause processing logic 320 to perform processes that are described herein.

Figure 4:
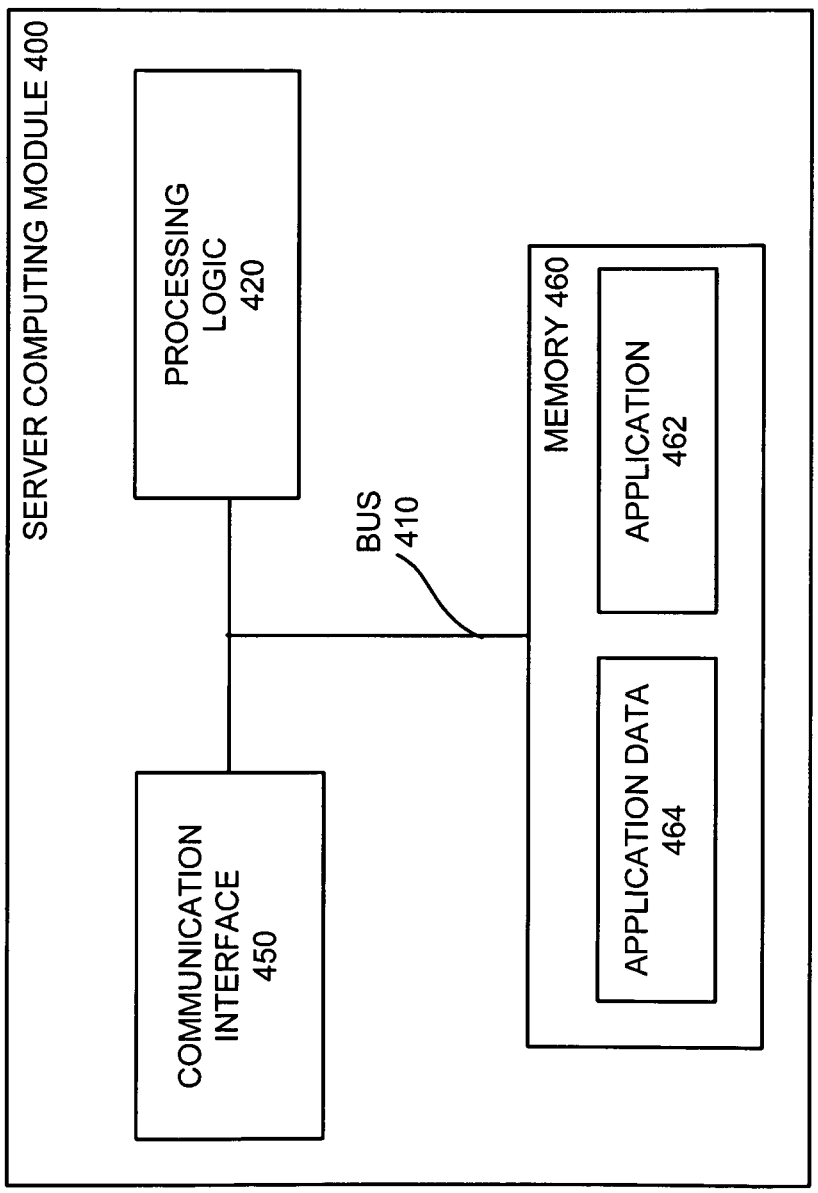
FIG. 4 is a block diagram of exemplary components of a server computing module.

FIG. 4 is a block diagram of exemplary components of a server computing module 400. Devices 208-218 may include one or more server computing modules (e.g., a rack of server computer modules), such as computing module 400. Server computing module 400 may include a bus 410, processing logic 420, a communication interface 450, and a memory 460. Server computing module 400 may include other components (not shown) that aid in receiving, transmitting, and/or processing data. Moreover, other configurations of components in module 400 are possible.

Bus 410 may include a path that permits communication among the components of module 400. Processing logic 420 may include any type of processor or microprocessor (or families of processors or microprocessors) that interprets and executes instructions. In other embodiments, processing logic 420 may include an ASIC, an FPGA, or the like.

Communication interface 450 may include any transceiver-like mechanism that enables module 400 to communicate with other devices and/or systems. Communication interface 450 may include a transmitter that may convert baseband signals from processing logic 420 to RF signals and/or a receiver that may convert RF signals to baseband signals. Alternatively, communication interface 450 may include a transceiver to perform functions of both a transmitter and a receiver. Communication interface 450 may be coupled to an antenna for transmission and reception of the RF signals. Communications interface 450 may include a network interface card, e.g., Ethernet card, for wired communications or a wireless network interface (e.g., a WiFi card) for wireless communications. Communication interface 450 may also include, for example, a USB port for communications over a cable, a Bluetooth wireless interface for communicating with Bluetooth devices, a NFC interface, etc. Communication interface 450 may implement a wireless communication protocol, e.g., GSM, CDMA, WCDMA, GPRS, EDGE, etc. Communications interface 450 may receive, transmit and/or process digital or analog audio inputs/outputs and/or digital or analog video inputs/outputs.

Memory 460 may include a RAM or another type of dynamic storage device that may store information and instructions, e.g., an application 462 and application data 464, for execution by processing logic 420; a ROM device or another type of static storage device that may store static information and instructions for use by processing logic 420; and/or some other type of magnetic or optical recording medium and its corresponding drive, e.g., a HDD, for storing information and/or instructions.

In the case of subscription server 210, for example, application 462 may include an application to add or remove bundles to a subscriber's bundle tree, such as bundle tree 100 for subscriber 102; and to select the appropriate bundle for serving a subscriber, such as subscriber 102, for example.

Server computing module 400 may perform certain operations, as described in detail herein. Server computing module 400 may perform these operations in response to processing logic 420 executing software instructions contained in a computer-readable medium, such as memory 460. The software instructions may be read into memory 460 from another computer-readable medium or from another device via communication interface 450. The software instructions contained in memory 460 may cause processing logic 420 to perform processes that are described herein.

FIG. 5A-5D are block diagrams of exemplary data stored in bundles, such as any one of bundles 110-134 illustrated in FIG. 1. In particular, FIG. 5A shows Basic Calling Plan bundle 110, FIG. 5B shows Free Nights and Weekends calling plan bundle 112, FIG. 5C shows Voicemail bundle 114, and FIG. 5D shows International Roaming bundle 115. The bundles may be stored in memory 460 of subscriber server 210, for example, or in any other device in network 200.

The bundles, such as bundle 110 shown in FIG. 5A as an example, may include entries relating to the features and/or characteristics of the bundle. Entries may include, for example, a name field 502, a rules field 503, a type field 504, an ID field 506, a periodic field 507, a period field 508, a bundle-on-use (BOU) field 510, a fixed renewal date field 512, a prorate field 514, a renewal fee field 516, a renewal failure actions field 518, a priority field 520, and a trigger criteria field 522. Fields 502-522 may be defined by the service provider (e.g., the phone company) and may be common to all instances of bundle 110 with the same name field 502 for all the subscribers, for example.

Bundle 110 may also include an renewal date field 530, a renew next period field 531, a total renewal fee field 532, a state field 534, and a children field 536. Fields 530-536 may include information specific to each instance of the bundle, e.g., information corresponding to a specific one of the subscribers who have subscribed to bundle 110. For example, two different state fields 534 for two different subscribers may indicate that one subscriber is associated with a bundle in an active state, while the other is associated with the same bundle in a suspended state. Bundles may include more or fewer fields not listed here.

Name field 502 may include the name associated with the bundle. In the case of bundle 110, the bundle name is Basic Calling Plan. Other names include Free Nights and Weekends, and International Roaming, as shown in FIG. 1.

Rules field 503 may include the rules for the services provided for by the bundle. For example, the Basic Calling Plan bundle 110 of FIG. 5A indicates that domestic calls are $0.20 per minute and international calls are $1.20 per minute. As another example, rules field 505 of Free Nights and Weekends bundle 112, as shown in FIG. 5B, indicates that calls are free on Saturday and Sunday and on Monday through Friday from midnight to 6 a.m. and from 7 p.m. to midnight.

If two bundles may apply to a service request by a subscriber, priority field 520 may be used to determine which bundle rule should apply in case of a conflict. For example, the Basic Calling Plan bundle 110 and Free Nights and Weekends bundle 112 may both apply to a call originating on a Saturday, but each specifies a different rate. Because the priority indicated in priority field 520 of bundle 112 (10) is higher than the priority indicated in priority field 520 of bundle 110 (5), the rule from the Free Nights and Weekends would apply. Priority field 520 may also be used to select the appropriate rule from among multiple child bundles that may apply to a requested service in case of a conflict.

Type field 504 may indicate whether the bundle is a standalone bundle or may have (or already has) a child bundle associated with it. A standalone bundle may include a bundle that cannot have any other bundle immediately associated with it. A family bundle is a bundle that may include one or more child bundles. A child bundle may add a service feature, for example, to a parent bundle. As shown in FIG. 5A, for example, bundle 110 may be part of a family of bundles, as indicated in bold in type field 504. As shown in FIG. 1, bundles 112 and 114 are children of bundle 110 and add service features to bundle 110.

ID field 506 may be used to identify bundles that are permitted to be a child or parent to the current bundle. For example, bundle 110 includes an ID field 506 value of 1156 and can therefore be the parent or child of any other bundle with the same value in its ID field 506 (e.g., bundle 112 and/or bundle 114 which both have the same ID field 516 value of 1156).

Periodic field 507 may indicate whether the bundle may be renewed on a periodic basis, such as daily, weekly, or monthly. As shown in FIG. 5A field 507, bundle 110 is a periodic bundle. Period field 508 may indicate whether the bundle, if periodic, renews on a daily, weekly, monthly, etc., basis. As shown in bold in field 508 of FIG. 5A, bundle 110 may renew on a monthly basis.

BOU field 510 may indicate whether the bundle can be renewed by trigger criteria. Trigger criteria field 522 may indicate the criteria that must be met in order to renew the bundle. Trigger criteria may include sending an SMS or placing a telephone call, for example. As shown in bold in BOU field 510 in FIG. 5A (NO), bundle 110 is not the type of bundle that is renewed based on trigger criteria. As shown in bold in BOU field 510 in FIG. 5D (YES), however, renewal of International Roaming bundle 115 may be triggered based on the origination of a call from an foreign country (as defined in field 522 of International Roaming bundle 115).

Fixed renewal date field 512 may indicate whether a periodic bundle is to be renewed on the same day of each month or week. For example, a fixed renewal date field of YES may indicate that the bundle should be renewed on, for example, the 15th of every month regardless of whether the bundle has been suspended for a period of time. A fixed renewal date field of NO may indicate that the bundle may renew on any date, such as 30 days after a bundle is activated after being in the suspended state.

Prorate field 514 may indicate whether the renewal fee should be prorated if the bundle had been suspended for a period of time. Renewal fee field 516 may indicate the price of the bundle, e.g., the price per period specified in period field 508 for a bundle, for example.

Renewal failure actions field 518 may indicate the actions that may be taken when a bundle fails to be renew renewed. For example, if Basic Calling Plan bundle 110 fails to be renewed (e.g., it becomes suspended), the failure actions may include blocking non-emergency calls, as specified in field 518 in FIG. 5A. In one embodiment, actions specified in field 518 may include limiting (e.g., suspending) services of a different family of bundles associated with the same subscriber. In yet another embodiment, actions specified in field 518 may include actions that limit or affect the subscriber's account (e.g., non-bundle related functionality), such as restricting any type of services for the subscriber (except emergency calls or calls to customer service).

Renewal date field 530 may indicate the next date that the bundle will be renewed or will expire. Total renewal fee field 532 may include the sum of the renewal fees for all the bundles in a family, such as the family defined by bundles 110, 112, and 114. In other words, total renewal fee field 532 may include the sum of field 516 of the parent bundle and the renewal fee fields 516 of all the children of the parent bundle. For example, the renewal fee field 532 of Basic Calling Plan bundle 110 is $24, which is the sum of renewal fee field 516 in FIG. 5A, renewal fee field 516 in FIG. 5B (belonging to Free Nights and Weekends child bundle 112), and the renewal fee field 516 of FIG. 5C (belonging to Voicemail child bundle 114).

State field 534 may indicate whether the bundle, associated with a particular subscriber, is currently suspended or active. In a suspended state, the actions specified in renewal failure actions field 518 may be implemented. In an active state, the actions specified in the renewal failure actions field 518 may be lifted and the rules specified in rules field 503 may be implemented. Thus, if the actions specified in renewal failure actions field 518 limited services in the bundle, another bundle, or on an account when the bundle was suspended, once the bundle moves from the suspended to the active sate (as indicated in state field 534), then the limitations to services in the bundle, the other bundle, or the account may be lifted and the services in the bundle, the other bundle, or the account may return to normal. As shown in bold in state field 534 of FIG. 5A, bundle 110 is in an active state.

Renew next period field 531 indicates whether the bundle, associated with a particular subscriber, is to be automatically renewed when the current period ends (e.g., at the renewal date field).

Children field 536 may indicate whether the bundle, associated with a particular subscriber, is associated with any child bundles. If so, the bundle may also store the address (such as memory address) of any such child bundles. For example, consistent with FIG. 1, Basic Calling Plan bundle 110 indicates in field 536 (YES, in bold) that it has at least one child bundle, whereas Free Nights and Weekends bundle 112 and Voicemail bundle 114 indicate in field 536 (NO, in bold) that they do not have any child bundles associated with them.

Figure 6:
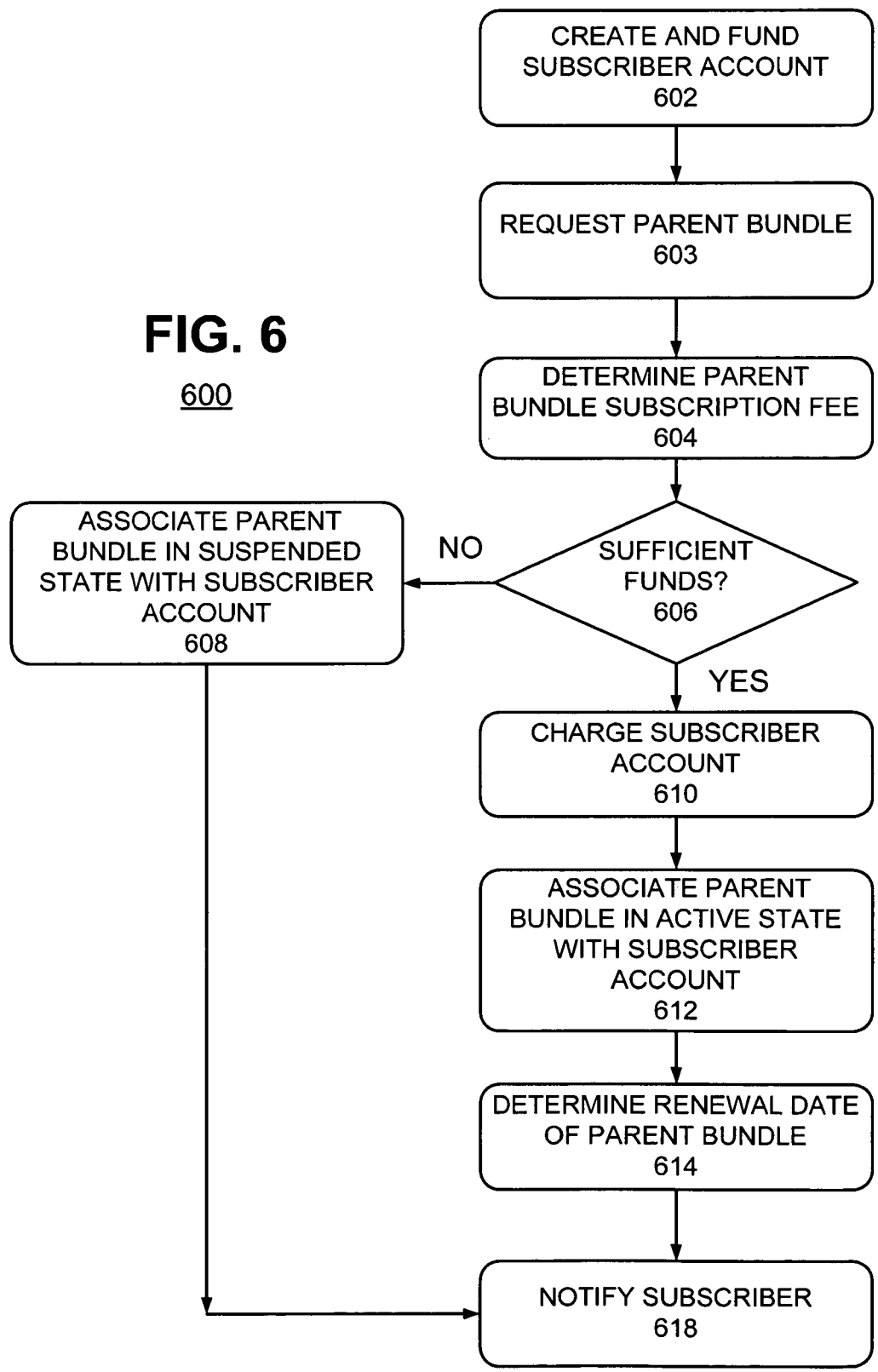
FIG. 6 is a flowchart of an exemplary process for adding a parent bundle to a subscriber bundle tree.

FIG. 6 is a flowchart of an exemplary process 600 for adding a parent bundle to a subscriber account. Process 600 may be performed by subscription server 210, computer 204, or other components of network 200. Process 600 may begin when a subscriber account is created and funded (block 602). A subscriber may create and fund an account by, for example, visiting a point of sale location (e.g., a store or kiosk), calling customer service (e.g., using mobile phone 202), or through a web browser (e.g., using computer 204). The subscriber may fund the account by providing a credit card number, for example. The subscriber may create and fund the account to avail himself of the services provided by network 200. Data regarding the account and the account balance may be stored in memory 460 of subscriber computer 210.

Figure 7:
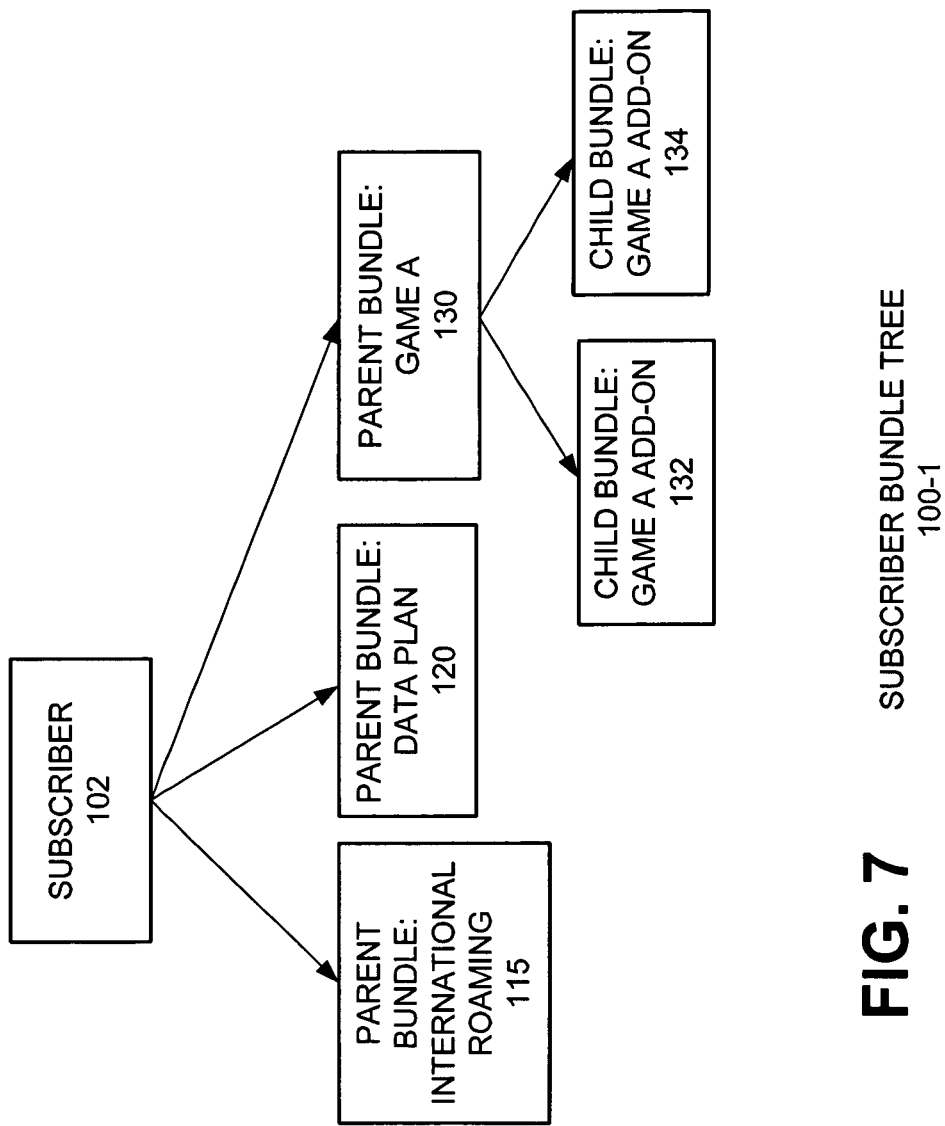
FIGS. 7 and 8 are block diagrams of the bundle tree of FIG. 1 in different states.

A parent bundle may be requested (block 603). For example, the subscriber may request a parent bundle (e.g., request the addition of a new subscription to a service) by, for example, visiting a point of sale location (e.g., a store or kiosk), calling customer service (e.g., using mobile phone 202), or through a web browser (e.g., using computer 204). For example, FIG. 7 shows subscriber bundle tree 100 of FIG. 1 in a state 100-1 without bundles 110, 112, or 114. The requested bundle may include Basic Calling Plan 110.

Figure 8:
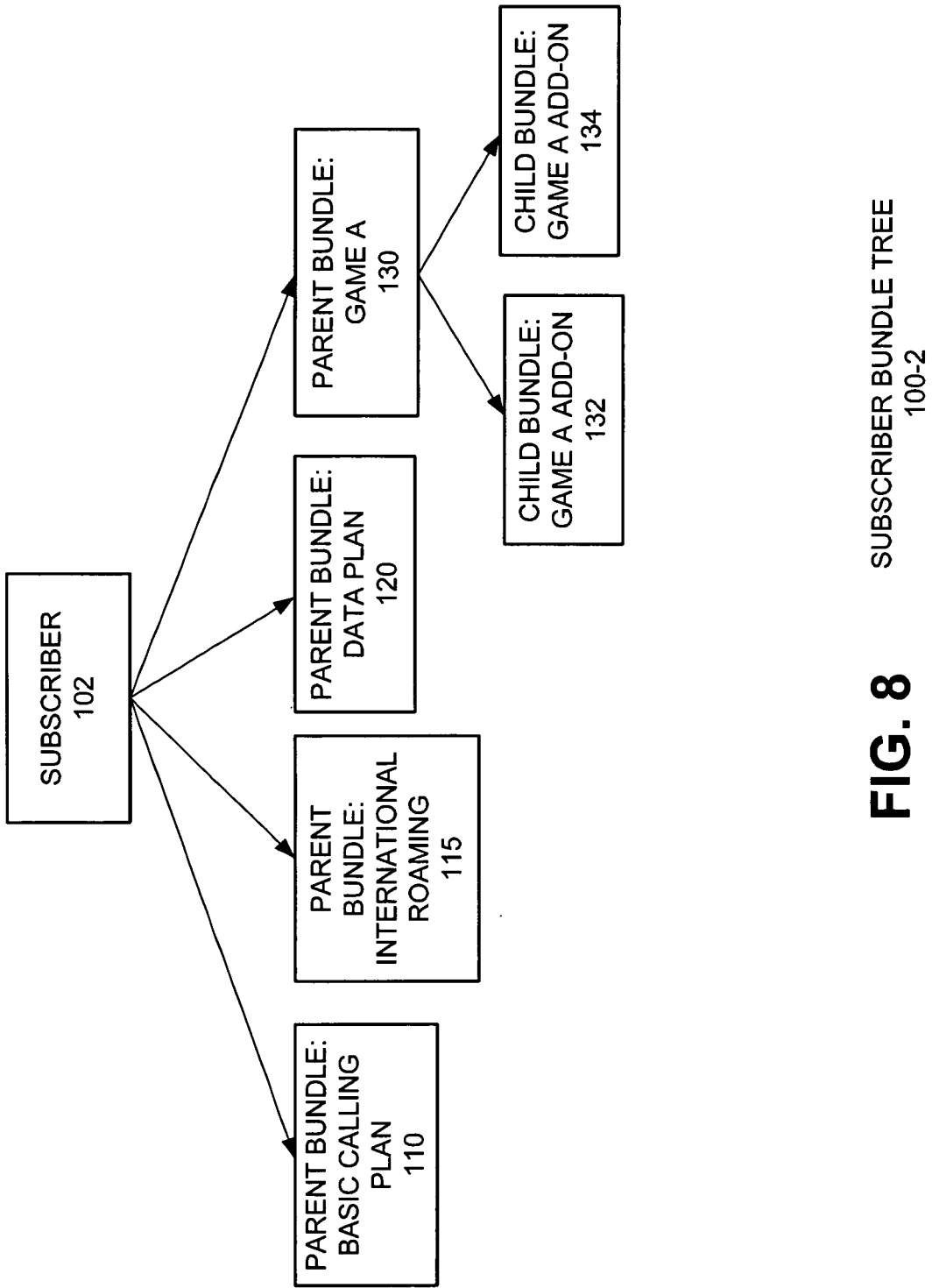

The fee for the requested parent bundle may be determined (block 604). In one embodiment, the fee for the bundle may be stored in renewal fee field 516 or may be a different value stored, for example, in a separate subscription fee field. If the subscriber's account has sufficient funds (block 606: YES), then the request for the parent bundle may be granted and the determined fee may be charged to the subscriber's account (block 610). In this case (block 606: YES), the requested bundle may be associated with the subscriber's account in an active state (as indicated in state field 534) (block 612). For example, subscriber bundle tree 100-2 of FIG. 8 includes Basic Calling Plan bundle 110, which has been added to bundle tree 100-1 of FIG. 7.

The renewal date for the parent subscription may be determined (block 614). For example, as shown in bundle 110 of FIG. 5A, if the subscriber adds a bundle on December 21, and the bundle is a monthly bundle, the renewal date may be determined as January 21 (e.g., one month after the subscription date). If the subscriber adds a bundle on January 10, and the bundle is a weekly bundle, the renewal date may be determined as January 17 (e.g., one week after the subscription date). The subscriber may be notified (block 618) of his new subscription and renewal date by, for example, SMS or email.

If the subscriber's account does not have sufficient funds (block 606: NO), then the request for the parent bundle may be granted, but the requested bundle may be associated with the subscriber's account in a suspended state (block 608). A suspended state may, for example, disallow the features provided for by the bundle depending on renewal failure actions field 518 of the bundle. The subscriber may be notified (block 618) of his new subscription and its inactive state by, for example, SMS or email. In this case (block 606: NO), the subscriber may activate the bundle (e.g., remove it from the suspended state) by adding funds to his account according to, for example, process 1100, described below.

In the above example, the requested bundle becomes active only after the subscriber pays for it and his account is charged. In this regard, the service provided for by the bundle is a pre-paid service. In another embodiment, the service provided for by the bundle may not be a pre-paid service, but may be based on credit associated with a subscriber rather than actual funds in an account.

Figure 9:
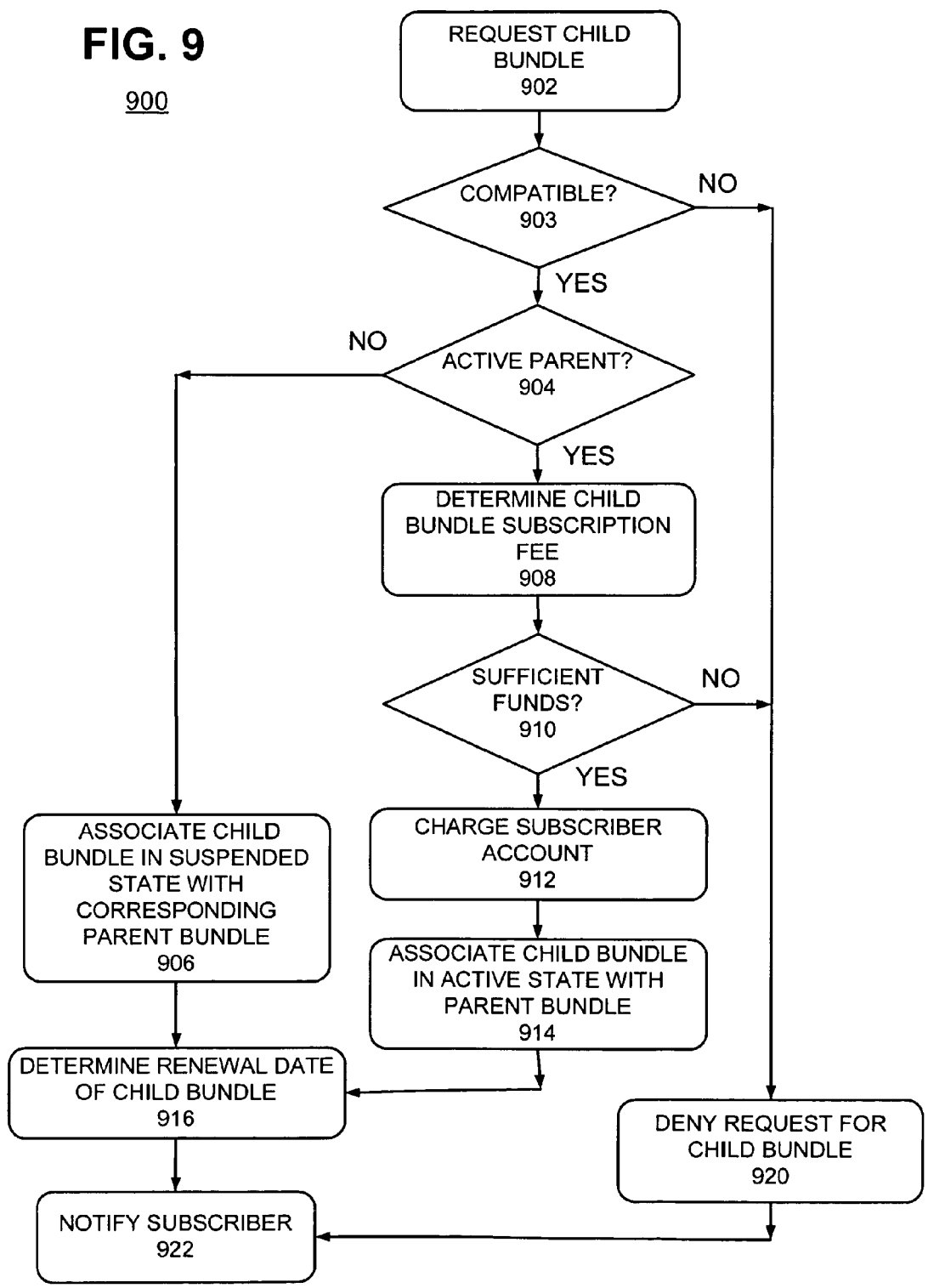
FIG. 9 is a flowchart of a process for adding a child bundle to the bundle shown in FIG. 8.

FIG. 9 is a flowchart of a process 900 for adding a child bundle. Process 900 may be performed by subscription server 210, computer 204, or other components of network 200. Process 900 may begin when a subscriber requests a child bundle (e.g., when a subscriber requests a feature associated with a child bundle) (block 902). For example, the subscriber may request a child bundle (e.g., request adding a new feature to a subscription) by, for example, visiting a point of sale location, calling customer service (e.g., using mobile phone 202), or through a web browser (e.g., using computer 204). The child bundle may be requested the same day or a different day than the parent bundle requested in block 603. For example, a subscriber may request the addition of Free Nights and Weekends bundle 112 to be added to Basic Calling Plan bundle 110 shown in subscriber bundle tree 100-2 of FIG. 8.

The compatibility of the child bundle with the parent bundle may be determined (block 903) by comparing, for example, ID field 506 of the parent bundle with the same field in the child bundle. If the ID fields match, then the child bundle may be considered compatible with the parent bundle and process 900 may continue to block 904. If the child bundle is not compatible, then the request for the child bundle may be denied (block 920). As an example, Free Nights and Weekends bundle 112 includes an ID field 506 value of 1156 (FIG. 5B), which is the same as the ID field 506 of Basic Calling Plan bundle 110 (FIG. 5A), indicating that bundle 112 is compatible with bundle 110.

If the parent bundle is suspended, e.g., not active (block 904: NO), the request for the child bundle may be granted, but the requested child bundle may be associated with the parent bundle in the subscriber's account in a suspended state (block 906). In this case, the subscriber may activate the bundle (e.g., remove it from the suspended state) by adding funds to his account according to, for example, process 1100, described below.

On the other hand, if the parent is in the active state (block 904: YES), the fee for the requested child bundle may be determined (block 908). In one embodiment, the fee for the bundle may be stored in renewal fee field 516 or may be a different value stored, for example, in a separate subscription fee field (not shown). If the subscriber's account has sufficient funds (block 910: YES), then the request for the child bundle may be granted and the determined fee may charged to the subscriber's account (block 912). In this case, the requested bundle may be associated (in an active state) with the parent bundle in the subscriber's account (block 914).

If the subscriber's account does not have sufficient funds (block 910: NO), and the parent bundle is active (block 904: YES), then the request for the child bundle may be denied (block 920). In other words, this embodiment does not allow for an active parent bundle to have an inactive child bundle (e.g., a child bundle that was added in a suspended state similar to block 906). In another embodiment, the child bundle may be added (in an inactive state) to a parent bundle (in an active state) when the subscriber does not have sufficient funds to cover the subscription fee for the child bundle.

In the case where the child bundle is added (block 906 or block 914), the renewal date for the parent subscription may be determined (block 916). In one embodiment, the renewal date of the child bundle may be determined based on the renewal date of the parent bundle. In this embodiment, the renewal date for the child bundle may be set to to be the same as the renewal date for the parent bundle. This embodiment may simplify the renewal process for the subscriber because the subscriber only has to remember one date, as opposed to two (or even more) dates. As a result, this embodiment may result in a higher percentage of successful bundle renewals because the subscriber can more easily take actions to ensure a sufficient account balance at the appropriate times. In another embodiment, the renewal date of the parent may be changed to be the renewal date of the child if the child bundle indicates a higher rank (as indicated in a rank field, not shown). In yet another embodiment, the renewal date of the child bundle and the parent bundle may be two different dates, e.g., each may be based on their respective subscription dates.

For example, in this embodiment, if the subscriber adds parent bundle 110 (with a monthly period) on March 20, the renewal date may be set to April 20 as shown in FIG. 5A. If the subscriber adds a child bundle to his account between March 25, the renewal date for the child bundle becomes April 20, meaning that the child bundle will also be renewed on the 20th. In this embodiment, a subscriber only has to remember a single day of the month, for example, to have sufficient funds in his account for renewing that family of bundles. In another embodiment, however, if a child bundle with a higher ranking than the parent bundle (indicating the child bundle will become the new parent bundle) is added on the 25th of the month, the renewal date of the original parent bundle will change to align with the newly added child (e.g., the 25th of the next month).

Figure 10:
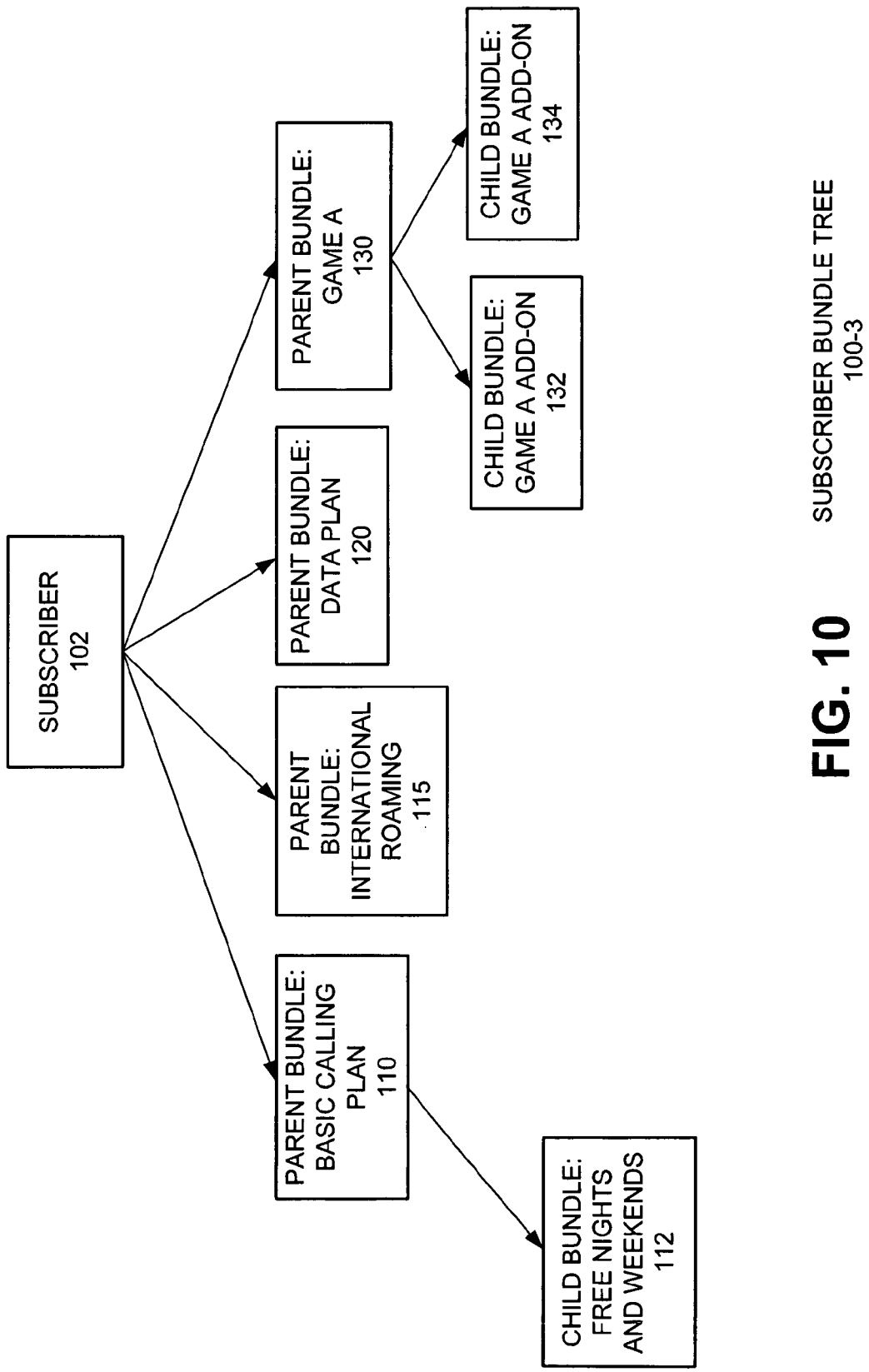
FIG. 10 is a block diagram of the bundle tree of FIG. 1 in a different state.

The subscriber may be notified (block 918) by, for example, an SMS or email regarding whether the request for the child bundle was granted or denied and, if the bundle was granted, the subscriber may be notified whether the bundle is active or suspended and of the renewal date. As shown in FIG. 10, Free Nights and Weekends bundle 112 has successfully been added as a child bundle to Basic Calling Plan bundle 110.

A subscriber may also request that a parent or a child bundle be removed, e.g., not renewed. For example, the subscriber may request that a child or parent bundle be removed by, for example, visiting a point of sale location, calling customer service (e.g., using mobile phone 202), or through a web browser (e.g., using computer 204). Subscription server 210 may mark a bundle for removal by changing renew next period field 531 from YES to NO. If a bundle that is marked for removal has children, then the children may be moved to a different parent bundle if such a parent bundle is present in the bundle tree that supports the child bundles (e.g., a parent bundle with the same ID field 506 and type field 504).

Figure 11:
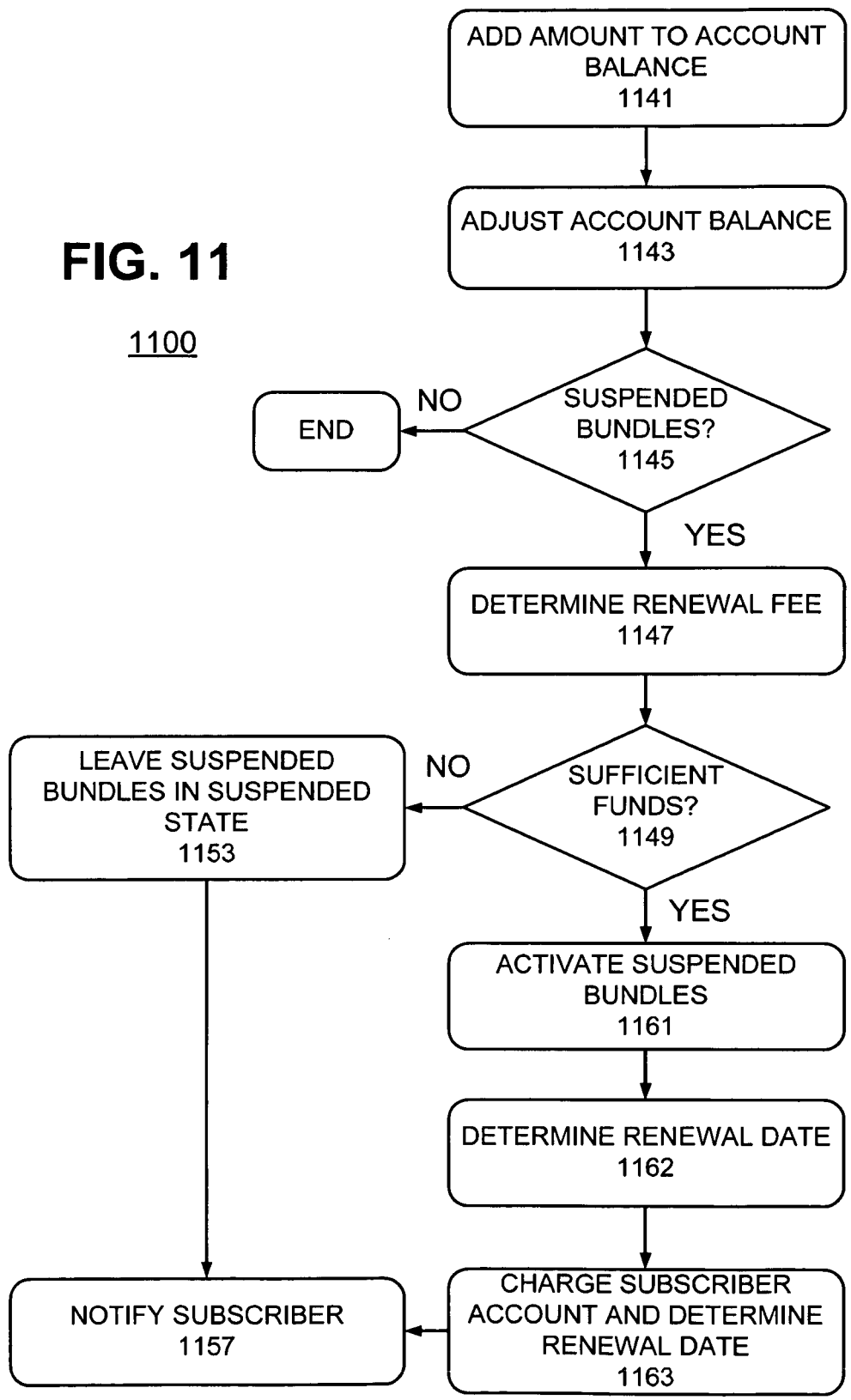
FIG. 11 is a flowchart of an exemplary process for recharging a subscriber's account.

FIG. 11 is a flowchart of an exemplary process 1100 for recharging (e.g., adding funds to) a subscriber's account balance. Process 1100 may be performed by subscription server 210, computer 204, or any device in network 200. Process 1100 may begin when a subscriber adds money, credits, etc., to his account balance (block 1141). The account balance may be adjusted (block 1143) to reflect the new money, credits, etc. If no bundles or families of bundles associated with the subscriber's account are in a suspended state (block 1145: NO), then process 1100 may end. If a bundle or a family of bundles associated with the subscriber's account is in a suspended state, then the renewal fee for the suspended bundle(s) may be determined (block 1147).

The fee for the bundle may be stored in renewal fee field 516 or may be a different value stored, for example, in a separate subscription fee field. The fee for a family of bundles may be calculated and stored in total renewal fee field 532 for the family of bundles. In one embodiment, the renewal fee may be prorated based on the time left before the next renewal date. Whether to prorate a bundle or family of bundles may be determined by inspecting prorate field 514. For example, assume the subscriber adds a periodic, monthly bundle on May 10. On October 10, a renewal date, the subscriber's balance is insufficient to cover the bundle renewal fee and the bundle becomes suspended. The subscriber recharges his account on October 21, 11 days after the renewal date but 20 days before the next renewal date of November 10. The renewal fee may be reduced by the ratio of 20/(11+20)=0.63. In yet another embodiment, the renewal fee may not be prorated and it may include the full fee for the full time period from suspension of the bundle(s) to the renewal date. The renewal fee may also include a late fee or a reactivation fee.

If the subscriber's account balance is not sufficient to cover the renewal fee (block 1149: NO), then the suspended bundle(s) may be left in the suspended state (block 1153). In this case, the subscriber may be notified of this condition by, for example, SMS or email (block 1157). In this embodiment, the subscriber needs sufficient funds to activate the entire family of bundles, otherwise none of the bundles in the family is activated. Thus, this embodiment does not allow for an active parent bundle to have an inactive child bundle. In a different embodiment, process 1100 may allow for the activation of a parent bundle but not the child bundle if the subscriber has sufficient funds to activate only the parent.

If the balance in the subscriber's account is sufficient to cover the renewal fee (block 1149: YES), then the suspended bundles(s) may be activated or reactivated (e.g., removed from the suspended state). Activating or reactivating a bundle may include changing the value in state field 534 to ACTIVE. If a bundle is moved to the active state from a suspended state, the actions specified in the renewal failure actions field 518 may be lifted and the rules specified in rules field 503 may be implemented. Thus, if the actions specified in renewal failure actions field 518 limited services in the bundle, another bundle, or on an account when the bundle was suspended, once the bundle moves from the suspended to the active sate, then the limits to services in the bundle, the other bundle, or the account may be lifted and the services in the bundle, the other bundle, or the account may return to normal.

The renewal date may be determined (block 1162). If the bundle(s) have a periodic renewal date (e.g., as set in periodic field 507), then the renewal date (e.g., in renewal date field 530) may be reset to the next month, week, or day (depending on the value set in period field 508). As an example, if the bundle is periodic on a fixed monthly basis (e.g., fixed renewal date field 512 is YES and period field 508 is MONTHLY), and a suspended bundle that normally renews on the 10th of each month is renewed on the 21st of the month, then the next renewal will take place on the 10th of the next month. This embodiment provides the subscriber with predictability of a fixed renewal date, which may result in a higher percentage of successful bundle renewals because the subscriber can take actions to ensure a sufficient account balance at the appropriate time. If the bundle(s) have a variable monthly renewal period (e.g., fixed renewal date field 512 is NO and period field 508 is MONTHLY), and the suspended bundle that previously renewed on the 10th of each month was renewed on the 21st, then the next renewal date may be the set to the 21st of the next month.

If the balance in the subscriber's account is sufficient (block 1149: YES), then subscriber's account may be charged (block 1163) and the subscriber may be notified (block 1157). In one embodiment, process 1100 may repeat and bundles or families of bundles may be renewed in order of priority.

Figure 12:
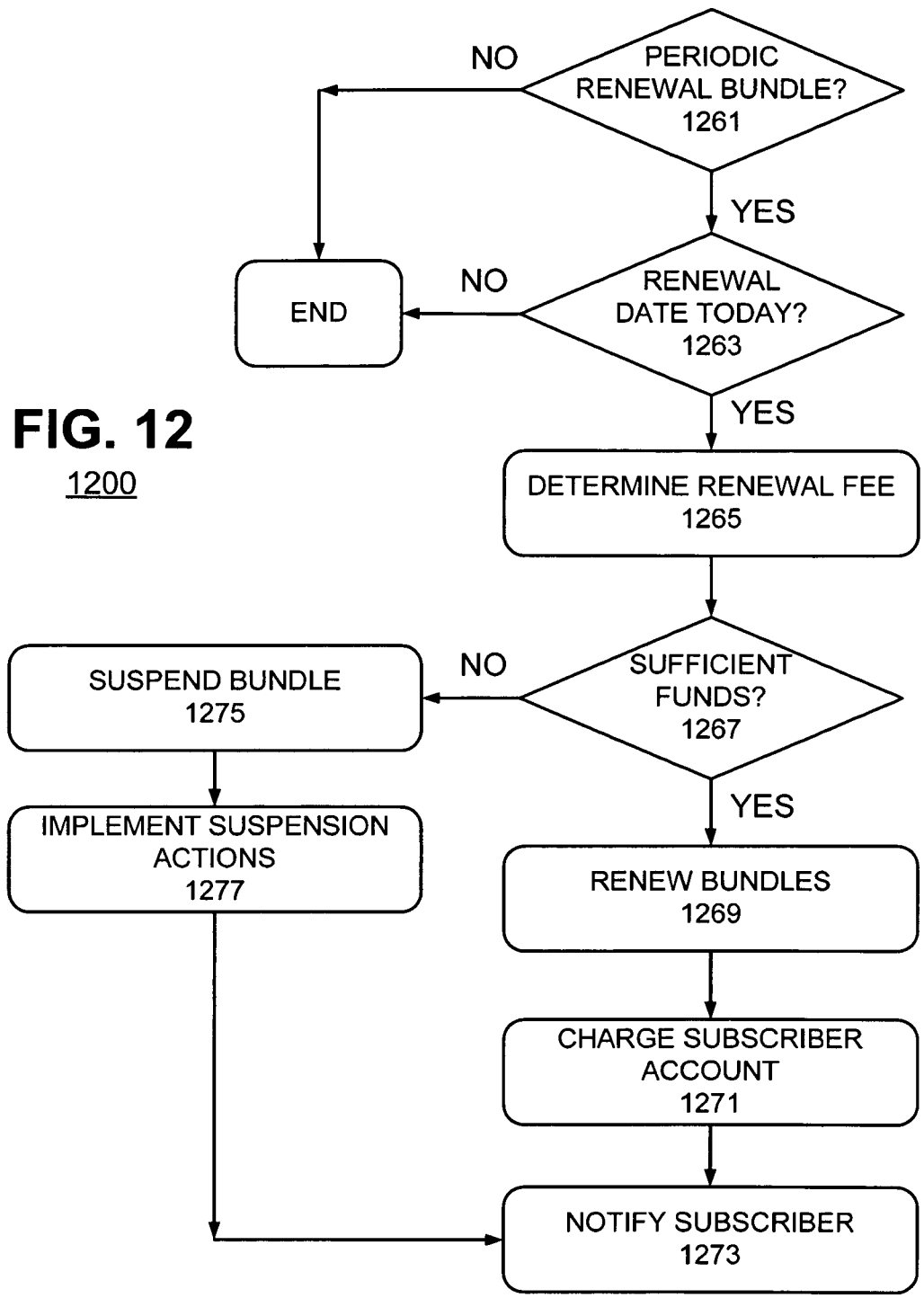
FIG. 12 is a flowchart of an exemplary process for renewing a bundle or a family of bundles.

FIG. 12 is a flowchart of an exemplary process 1200 for renewing a bundle or a family of bundles. Process 1200 may be performed by subscription server 210 on a periodic basis, such as every day or every hour, or after an event, such as when a subscriber places a service request (e.g., places a call or sends an SMS). Process 1200 may be performed for every family of bundles (and/or for every standalone bundle) for every subscriber in network 200.

Process 1200 may begin by determining whether a bundle associated with a subscriber's account includes a periodic renewal period (block 1261). Subscription server 210 may determine if a bundle is a periodic bundle by inspecting field 507 of a bundle. If the bundles includes a periodic renewal period (block 1261: YES), and the renewal date is the current day (block 1263: YES), then the renewal fee may be determined (block 1265). The renewal fee may be determined by inspecting total renewal fee field 532 or by adding the renewal fee in renewal fee field 516 with the renewal fees specified in renewal fee field 516 of any child bundles. The fee of a bundle marked for removal (e.g., field renew next period 536 is YES) may not be included in the total renewal fee.

For example, assume a subscriber has Basic Calling Plan bundle 110 with a monthly renewal fee of $20, Free Nights and Weekends child bundle 112 with a monthly renewal fee of $2, and Voicemail child bundle 116 with a renewal fee of $2. In this case, the total renewal fee for the family is $20+$2+$2=$24. If the renewal date for these bundles is January 20, then the family of bundles will be renewed on the 20 of each month, assuming the subscriber has sufficient funds ($24) in his account on that day.

If the subscriber has sufficient funds in his account (block 1267: YES), then the bundles may be renewed (block 1269). Renewing the bundles may include updating the renewal date for the next renewal period, such as the next week (if the bundle is a weekly bundle) or the next month (if the bundle is a monthly bundle). The subscriber may be alerted of the renewed bundles and the renewal fees by, for example, SMS or email (block 1269).

If the subscriber does not have sufficient funds in his account (block 1267: NO), then the bundle(s) may be suspended (block 1275). Actions, specified in the bundle, may be taken when the bundle is suspended (block 1277). The actions taken may be defined in renewal failure actions field 518 and may include limiting services, such as imposing call blocking, turning off voicemail, etc. In one embodiment, actions taken may include suspending or limiting services of a different family of bundles associated with the same subscriber. In another embodiment, emergency calls and calls to customer service may still be allowed even in a suspended state. In yet another embodiment, actions taken may include actions that limit or affect the subscriber's account, e.g., non-bundle related functionality, such as restricting any type of services for the subscriber (except emergency calls or calls to customer service). If actions specified in one suspended bundle conflicts with actions in a different suspended bundle, then the actions specified in the bundle with the higher priority (e.g., defined in priority field 520) may take precedence. In one embodiment, actions specified in a non-BOU bundle (e.g., BOU field 510 of NO) may take precedence over actions specified in a BOU bundle (e.g., BOU field 510 of YES).

The subscriber may be alerted by, for example, SMS or email of the suspended bundle(s) (block 1275). The suspended bundles may be monitored and, if the bundles are not renewed, may be deleted after a certain time period.

Figure 13:
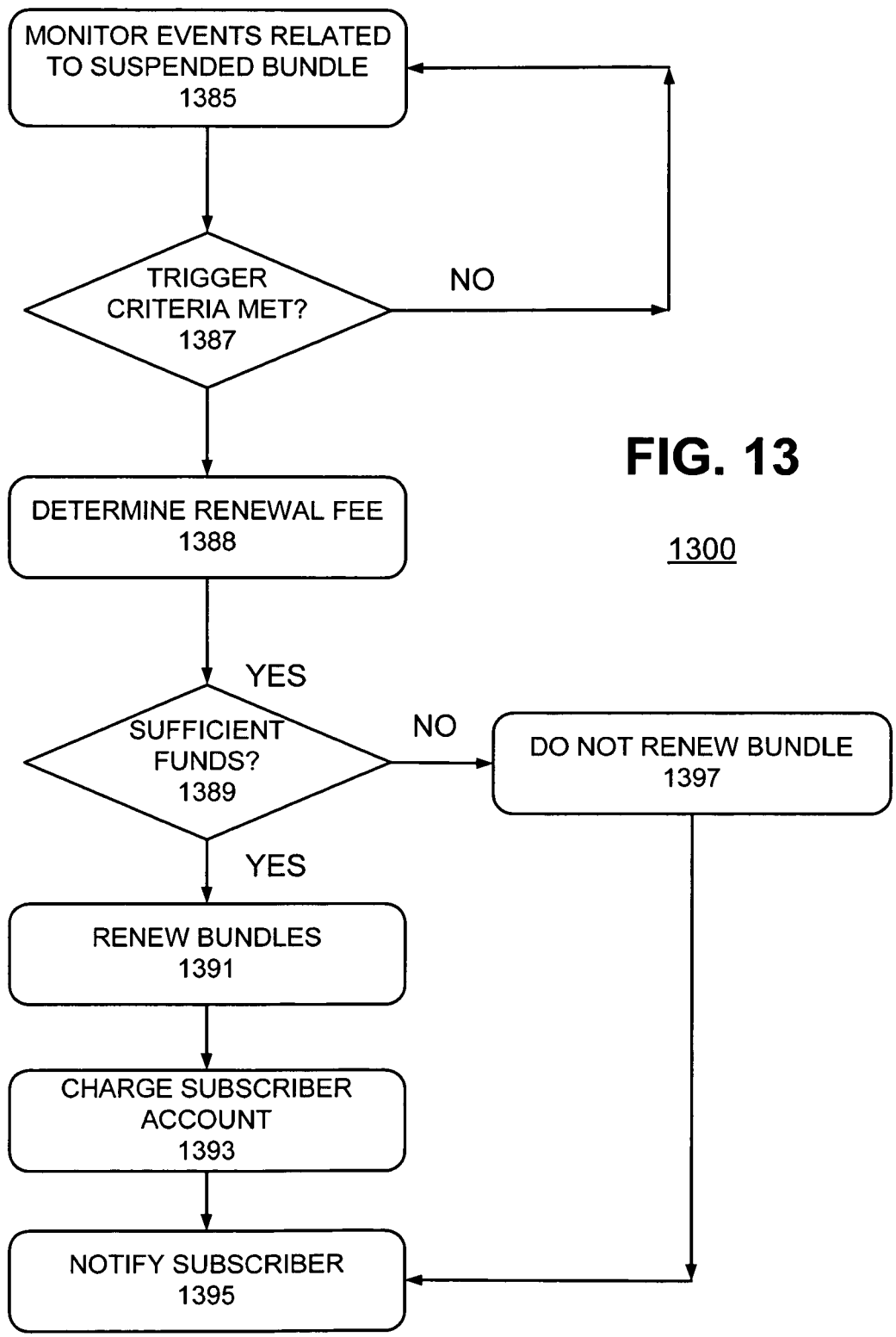
FIG. 13 is a flowchart of a process for renewing a bundle based on trigger criteria.

FIG. 13 is a flowchart of a process for renewing a bundle based on trigger criteria (e.g., a BOU). Process 1300 may be run by subscriber server 210 on a periodic basis or a continual basis. Process 1300 may begin by monitoring the events related to the trigger criteria defined in a suspended bundle (e.g., trigger criteria 522) (block 1385). Trigger criteria may include a successfully originated or received call from a particular destination, an SMS received or sent, etc. Thus, in this embodiment a bundle may be activated based on the subscriber's use. For example, International Roaming bundle 115 specifies that the trigger criteria may include a call being originated by the subscriber from a foreign country.

If the trigger criteria are met (block 1387: YES), the renewal fee may be determined (block 1388). The renewal fee may be determined by inspecting total renewal fee field 532 or by adding the renewal fee in renewal fee field 516 with the renewal fees specified in renewal fee field 516 of any child bundles. For example, upon a call originating from a foreign country for subscriber 102, subscription server 104 may determine that International Roaming bundle 115 specifies a renewal fee of $5. If the subscriber has sufficient funds in his account (block 1389: YES), then the bundle(s) may be renewed (block 1391). In this case, the subscribers account may be charged (block 1393) and the subscriber may be notified (block 1395) by, for example, SMS or email.

If the trigger criteria are met (block 1385: YES), but there are insufficient funds in the subscriber's account (block 1387: NO), then the bundle may not be renewed (block 1397) and the subscriber may be notified (block 1395) by, for example, SMS or email. Renewing the bundle may include, for example, resetting the renewal date in renewal date field 530. The subscriber may have the benefit of the bundle until the date specified in renewal date field 530. If the bundle is also characterized as a periodic bundle in field 507, then the bundle may be renewed by process 1200 on the renewal date. If the bundle is not characterized as a periodic bundle in field 507, then the bundle may expire by the renewal date. In the example of International Roaming bundle 115, once activated, it would stay active for a day (as specified in period field 507), but would not be renewed (as specified in periodic field 507).

Figure 14:
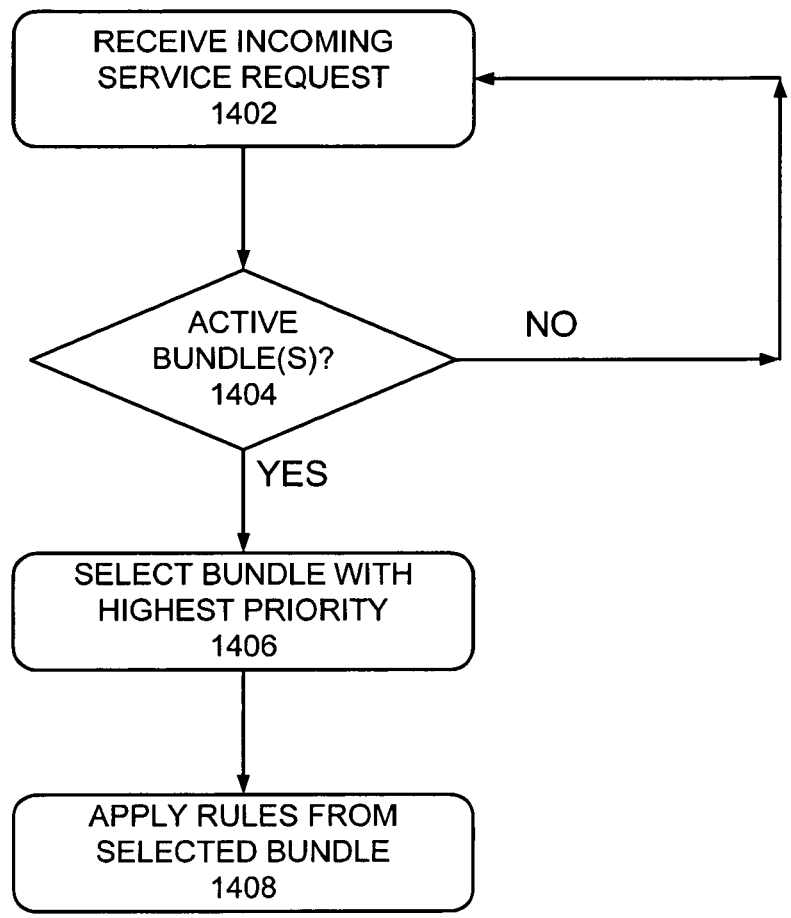
FIG. 14 is a flowchart of a process for selecting a bundle for servicing a subscriber.

FIG. 14 is a flowchart of a process 1400 for selecting a bundle for servicing a subscriber. In other words, when network 200 receives a service request from a subscriber (e.g., subscriber 102 places a phone call), network 200 may decide which bundle belonging to the subscriber applies to the request. Process 1400 may be performed by devices in network 200, such as subscription server 210.

A request for a service may be received (block 1402). For example, network 200 may receive a request to place a phone call, make a data connection, or play a game. Appropriate active bundles may be discovered (block 1404). For example, an incoming call from a foreign country may implicate both activate International Roaming bundle 115 (activated in process 1300) and Basic Calling Plan bundle 110. The bundle with the highest priority may be selected (block 1406). For example, in this current example, International Roaming Bundle 115 has a higher priority (10) than Basic Calling Plan bundle 110 (5). The rules from the selected bundle may be applied (block 1408). In the current example, the rules from the International Roaming Bundle 115 are applied and the incoming call from a foreign country may be placed at a rate of $0.50/minute (e.g., rule field 503 in bundle 115 of FIG. 5D) as opposed to $1.20/minute (e.g., rule field 503 in bundle 110 of FIG. 5A).

Likewise, a call originating on a Saturday may invoke Basic Calling Plan bundle 110 and Free Nights and Weekends bundle 112. Because the priority indicated in priority field 520 of bundle 112 (10) is higher than the priority indicated in priority field 520 of bundle 110 (5), the rule from the Free Nights and Weekends would apply and the subscriber would be not be charged for the call on the Saturday.

In another embodiment, the priority may be determined and/or the bundle selected may be determined by the different rates that would apply to the service. For example, Free Nights and Weekends bundle 112 may have a rate (FREE) than the Basic Calling Plan bundle 110 ($0.20) for a call on a Saturday. Because the rate of the Free Nights and Weekends bundle is lower than the Basic Calling Plan bundle, the Free Nights and Weekends bundle may be considered to have a higher priority and may be selected as the bundle for the call on a Saturday.

As disclosed herein, in one embodiment, when the renewal fee cannot be collected from a subscriber for a bundle, the subscriber may lose services for all the services in the family of that bundle. Services in the family of bundles may be restored when the subscriber sufficiently recharges his account. In one embodiment, when the subscriber recharges an account and a family of bundles is restored from a suspended state, the renewal date may remain the same (e.g., the same day of the month) and the subscriber may only be charged for the time period the family of bundles is actually active. Bundles in the same family may also share characteristics such as renewal period (monthly, weekly, or daily), for example.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While series of blocks have been described above with respect to different processes, the order of the blocks may differ in other implementations. Moreover, non-dependent acts may be performed in parallel.

It will be apparent that aspects of the embodiments, as described above, may be implemented in many different forms of software, firmware, and hardware in the embodiments illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to the embodiments based on the description herein.

Further, certain portions of the invention may be implemented as "logic" that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
   associating, in a database by a computer, a first bundle with a subscriber on a first subscription date, the first bundle defining a prepaid service, a first renewal date, a first renewal rank, and a first renewal fee;
   associating, in the database by the computer, a second bundle with the subscriber on a second subscription date different than the first subscription date and different than the first renewal date, the second bundle defining a feature, not defined in the first bundle, of the prepaid service, a renewal period, a second renewal rank, and a second renewal fee;
   associating, in the database, the second bundle with the first renewal date when the first renewal rank is greater than the second renewal rank, and associating the second bundle and the first bundle with a second renewal date, based on the second subscription date and the renewal period, when the second renewal rank is greater than the first renewal rank; and
   marking as renewed, in the database by the computer, the first bundle and the second bundle on the first renewal date or the second renewal date when a balance of an account associated with the subscriber is greater than or equal to the first renewal fee plus the second renewal fee, wherein the first bundle is associated with a first rate for the prepaid service and a first priority and the second bundle is associated with a second rate for the prepaid service and a second priority, the method comprising applying the first rate or the second rate based on a comparison of the first priority and the second priority when both the first bundle and the second bundle are active, wherein the first bundle is active when a function of the defined prepaid service is not limited for the subscriber, and wherein the second bundle is active when a function of the defined feature is not limited for the subscriber.

2. The computer-implemented method of claim 1, further comprising:
   marking the first bundle and the second bundle as suspended on the first renewal date or the second renewal date when the balance of the account is less than the first renewal fee plus the second renewal fee.

3. The computer-implemented method of claim 2, where marking as suspended includes implementing renewal failure actions associated with the first bundle or the second bundle, based on a comparison of the first priority and the second priority.

4. The computer-implemented method of claim 3, where the renewal failure actions include limiting the function of the prepaid service defined in the first bundle for the subscriber, limiting the function of the feature defined in the second bundle for the subscriber, limiting a function of a service for the subscriber defined in a third bundle associated with the subscriber, or limiting a function of the account associated with the subscriber.

5. The computer-implemented method of claim 3, further comprising:
   increasing the balance to reflect a recharge of the account;
   activating the first bundle and the second bundle if the increased balance is greater than or equal to a threshold, where the threshold is a sum of the first renewal fee and the second renewal fee or the threshold is a prorated fraction of the sum; and
   resetting the first renewal date or the second renewal date associated with the first bundle and the second bundle to be the renewal period after the first renewal date or the second renewal date.

6. The computer-implemented method of claim 5, where activating the first bundle or the second bundle includes stopping the implementation of the renewal failure actions associated with the first bundle or the second bundle.

7. The computer-implemented method of claim 1, where the first bundle and the second bundle have a parent-child data structure relationship, wherein the first bundle is a parent of the second bundle, and wherein the method further comprises:
   marking the second bundle as suspended and marking the first bundle for renewal on the first renewal date or the second renewal date when the balance of the account is greater than or equal to the first renewal fee but less than the second renewal fee.

8. The computer-implemented method of claim 1, further comprising:
   applying the first rate or the second rate based on a comparison of the first rate and the second rate.

9. The computer-implemented method of claim 8, where the prepaid service includes a telephone calling plan.

10. A system comprising:
    a memory to store:
        a database to associate a first bundle with a subscriber on a first subscription date, the first bundle defining a prepaid service, a first renewal date, a first renewal rank, and a first renewal fee,
        wherein the database is configured to associate a second bundle with the subscriber on a second subscription date different than the first subscription date and different than the first renewal date, the second bundle defining a feature, not defined in the first bundle, of the prepaid service, a renewal period, a second renewal rank, and a second renewal fee, the second bundle having the first renewal date; and
    a processor to
        associate, in the database, the second bundle with the first renewal date when the first renewal rank is greater than the second renewal rank, and associate the second bundle and the first bundle with a second renewal date, based on the second subscription date and the renewal period, when the second renewal rank is greater than the first renewal rank, and renew the first bundle and the second bundle on the first renewal date when a balance of an account associated with the subscriber is greater than or equal to the first renewal fee plus the second renewal fee, or to suspend the first bundle and the second bundle on the first renewal date when the balance of the account is less than the first renewal fee plus the second renewal fee,
wherein the first bundle defines a first rate for the prepaid service and a first priority and the second bundle defines a second rate for the prepaid service and a second priority, and wherein when the database indicates that both the first bundle and the second bundle are active, the processor is further configured to select between applying the first rate or the second rate based on a comparison of the first priority and the second priority, wherein the first bundle is active when a function of the defined prepaid service is not limited for the subscriber, and wherein the second bundle is active when a function of the defined feature is not limited for the subscriber.

11. The system of claim 10, wherein when the processor suspends the first bundle and the second bundle, the processor is further configured to implement renewal failure actions associated with the first bundle or the second bundle.

12. The system of claim 11, where the renewal failure actions include limiting the function of the prepaid service defined in the first bundle for the subscriber, limiting the function of the feature defined in the second bundle for the subscriber, limiting the function of a service for the subscriber defined in a third bundle associated with the subscriber, or limiting a function of the account associated with the subscriber.

13. The system of claim 11, where the processor is further configured to:
increase the balance to reflect a recharge of the account;
activate the first bundle and the second bundle if the increased balance is greater than or equal to a threshold, where the threshold is a sum of the first renewal fee plus the second renewal fee or the threshold is a prorated fraction of the sum; and
resetting the first renewal date of the first bundle and the second bundle to be a renewal period after the first renewal date, where the first bundle defines a renewal period.

14. The system of claim 13, wherein when the processor activates the first bundle or the second bundle, the processor is further configured to stop the implementation of the renewal failure actions associated with the first bundle or the second bundle.

15. The system of claim 11, where the first bundle defines a first rate for the prepaid service and a first priority and the second bundle defines a second rate for the prepaid service and a second priority, the processor being further configured to select between applying the first rate or the second rate based on a comparison of the first rate and the second rate.

16. A non-transitory computer-readable medium including computer-executable instructions, the computer-executable instructions including instructions to:
associate, in a database by a computer, a first bundle with a subscriber on a first subscription date, the first bundle defining a prepaid service, a first renewal date, a first renewal rank, and a first renewal fee;
associate, in the database by the computer, a second bundle with the subscriber on a second subscription date different than the first subscription date and different than the first renewal date, the second bundle defining a feature, not defined in the first bundle, of the prepaid service, a renewal period, a second renewal rank, and a second renewal fee;
associate, in the database, the second bundle with the first renewal date when the first renewal rank is greater than the second renewal rank, and associate the second bundle and the first bundle with a second renewal date, based on the second subscription date and the renewal period, when the second renewal rank is greater than the first renewal rank;
mark as renewed, in the database by the computer, the first bundle and the second bundle on the first renewal date or the second renewal date when a balance of an account associated with the subscriber is greater than or equal to the first renewal fee plus the second renewal fee,
wherein the first bundle is associated with a first rate for the prepaid service and a first priority and the second bundle is associated with a second rate for the prepaid service and a second priority; and
apply the first rate or the second rate based on a comparison of the first priority and the second priority when both the first bundle and the second bundle are active, wherein the first bundle is active when a function of the defined prepaid service is not limited for the subscriber, and wherein the second bundle is active when a function of the defined feature is not limited for the subscriber.

17. The non-transitory computer-readable medium of claim 16, wherein the instructions further comprise instructions to:
mark the first bundle and the second bundle as suspended on the first renewal date or the second renewal date when the balance of the account is less than the first renewal fee plus the second renewal fee.

18. The non-transitory computer-readable medium of claim 17, wherein the instructions to mark as suspended includes instructions to implement renewal failure actions associated with the first bundle or the second bundle, based on a comparison of the first priority and the second priority.

19. The non-transitory computer-readable medium of claim 18, wherein the instructions to implement renewal failure actions include instructions to limit the function of the prepaid service defined in the first bundle for the subscriber, instructions to limit the function of the feature defined in the second bundle for the subscriber, instructions to limit a function of a service for the subscriber defined in a third bundle associated with the subscriber, or instructions to limit a function of the account associated with the subscriber.

20. The non-transitory computer-readable medium of claim 18, wherein the instructions further comprise instructions to:
increase the balance to reflect a recharge of the account;
activate the first bundle and the second bundle if the increased balance is greater than or equal to a threshold, wherein the threshold is a sum of the first renewal fee and the second renewal fee or the threshold is a prorated fraction of the sum; and
reset the first renewal date or the second renewal date associated with the first bundle and the second bundle to be the renewal period after the first renewal date or the second renewal date.

21. The non-transitory computer-readable medium of claim 20, wherein the instructions to activate the first bundle or the second bundle includes instructions to stop the implementation of the renewal failure actions associated with the first bundle or the second bundle.

22. The non-transitory computer-readable medium of claim 16, wherein the first bundle and the second bundle have a parent-child data structure relationship, wherein the first bundle is a parent of the second bundle, and wherein the instructions further comprise instructions to:

mark the second bundle as suspended and marking the first bundle for renewal on the first renewal date or the second renewal date when the balance of the account is greater than or equal to the first renewal fee but less than the second renewal fee.

23. The non-transitory computer-readable medium of claim 16, wherein the instructions further comprise instructions to:

apply the first rate or the second rate based on a comparison of the first rate and the second rate.

24. The non-transitory computer-readable medium of claim 23, wherein the prepaid service includes a telephone calling plan.

\* \* \* \* \*